United States Patent [19]

Jones et al.

[11] Patent Number: 4,942,426

[45] Date of Patent: Jul. 17, 1990

[54] COVER SHEET CLEANING MEANS FOR A CONTACT PRINTER

[75] Inventors: Robert S. Jones; John J. Maurer, both of Rochester, N.Y.

[73] Assignee: Eastman Kodak Company, Rochester, N.Y.

[21] Appl. No.: 440,576

[22] Filed: Nov. 17, 1989

[51] Int. Cl.$^5$ .............................................. G03B 27/10
[52] U.S. Cl. ........................................ 355/84; 355/91; 355/132
[58] Field of Search ...................... 355/84, 91, 92, 93, 355/94, 132

[56] References Cited

U.S. PATENT DOCUMENTS

| | | | |
|---|---|---|---|
| 3,007,390 | 11/1961 | Forester et al. | 355/84 |
| 3,385,192 | 5/1968 | Qwarfort | 355/84 |
| 4,029,404 | 6/1977 | Mizukami et al. | 355/91 |
| 4,466,737 | 8/1984 | Hastings | 355/84 |
| 4,707,116 | 11/1987 | Newiger et al. | 355/84 |

Primary Examiner—Monroe H. Hayes
Attorney, Agent, or Firm—Robert L. Randall

[57] ABSTRACT

An improvement in a contact printer which comprises means for supporting a film and an original in superposed relationship on a vacuum table, means for providing a source of light for exposing the film through the original, and means for moving the light over the surface of the superposed film and original. A substantially impervious, flexible and transparent cover sheet carried by the light moving means is arranged to cover the superposed film and original as the exposing light is scanned across the film and original whereby the vacuum is applied to the film and the original to remove air from therebetween as the film is exposed by the light through the cover sheet and the original. The improvement comprises means for contacting the surface of the cover sheet during use and removing dust and dirt thereon to assure that the optical path for the exposing light remains clear and unobstructed.

7 Claims, 3 Drawing Sheets

COVER SHEET CLEANING MEANS FOR A CONTACT PRINTER

RELATED APPLICATIONS

The present application is related to our co-pending applications entitled A CONTACT PRINTER FOR EXPOSING SENSITIZED GRAPHIC ART FILM AND PAPER, Ser. No. 438,565, A METHOD OF EXPOSING SENSITIZED GRAPHIC ART FILM AND PAPER, Ser. No. 438,564, A COMPACT LIGHT COLLIMATOR FOR A SCANNING CONTACT PRINTER, Ser. No. 440,577, A COMPACT CONTACT PRINTER WITH A FLEXIBLE TRANSPARENT COVER SHEET, Ser. No. 438,822, and A REMOVABLE COVER SHEET ROLL FOR A CONTACT PRINTER, Ser. No. 438,567, all filed on even date herewith.

BACKGROUND OF THE INVENTION

Contact printing or exposure is a traditional graphic arts procedure for generating same size, high resolution reproductions of line and halftone film images. This technique ensures faithful original film image reproduction by placing the original film image in intimate contact with a receiving film or paper emulsion and, in the presence of a vacuum to hold them in intimate contact throughout the exposing process, exposing through the original film image to the receiving film or paper by means of a point or reflected light source. Typically, these images are of a relatively large size in order to meet the needs of the graphic arts industry and thus require large format originals and receiving films and the equipment necessary to handle such sized films.

Traditional silver halide contact films have sufficient photographic visible light sensitivity that the contacting exposure can be carried out with a simple, low cost, low energy tungsten light source. However, because of the sensitivity of these films to visible light, the contact exposure must be carried out in a darkroom environment. This causes a major inconvenience for the operator and results in a loss of productivity in the graphic arts production process.

In an attempt to improve graphic arts contact exposure productivity, film manufacturers have developed normal roomlight handling contact films. These films are photographically very insensitive to visible light, but have a relatively high UV sensitivity (although, in fact, having a relatively low UV sensitivity compared to the UV sensitivities of darkroom-handled film). These roomlight-handled films have improved the productivity of graphic arts contact exposure operations by eliminating the bottlenecks of the darkroom environment. However, they have also increased the use of high intensity, expensive, high UV output light sources. Metal halide light sources are a common type of UV light source used to expose these films.

One of the more important aspects of the graphic arts contact exposing or printing process is the need for accurately reproducing very fine lines and halftone dots. This has resulted in the requirement that the exposing light be collimated at the exposing plane so that such lines and dots can be reproduced accurately without undercutting or spreading and changing the size of the reproduced line or dot and the resulting image. Adequate light collimation has been achieved in the past by using a point light source mounted at a sufficiently great distance from the exposing plane that the light is substantially collimated by the time it reaches the exposure plane.

Given the large exposing plane area necessary for graphic arts purposes, the need for a high degree of light collimation to achieve accurate image reproduction, and the relative low photographic UV sensitivities of roomlight handling contact films, a high energy, expensive metal halide source has heretofore been required to expose these films. These high intensity UV light sources have required that the operator be shielded from the light source to avoid exposure to harmful UV radiation. Examples of such arrangements are illustrated in U.S. Pat. Nos. 4,029,404, 4,316,669, and 4,437,759. As a result, the total volume of space required for the graphic arts contact exposing set-ups of the prior art has been large and, since most printing shops have more than one of these exposing set-ups, the total volume of space required is significant.

It has been found that one of the limiting factors to increasing the productivity of graphic arts contact printers is that contact printers of the prior art have required that the exposure of the film wait until the film has been drawn into intimate contact throughout the entire extent of the interface with the original before the exposure can commence. A contact printer which permits the exposure to begin before the entire film/original laminate has been evacuated has been developed which employs a film cover sheet which is deployed over the original/film laminate and through which the film is exposed. It has been found that with use this cover sheet can become scratched and dirty, interfering with the accurate reproduction of graphic arts images.

SUMMARY OF THE INVENTION

Accordingly, the present invention provides an improvement in a contact printer which comprises means for supporting a film and an original in superposed relationship on a vacuum table, means for providing a source of light for exposing the film through the original, and means for moving the light over the surface of the superposed film and original. A substantially impervious, flexible and transparent cover sheet carried by the light moving means is arranged to cover the superposed film and original as the exposing light is scanned across the film and original whereby the vacuum is applied to the film and the original to remove air from therebetween as the film is exposed by the light through the cover sheet and the original. The improvement comprises means for contacting the surface of the cover sheet during use and removing dust and dirt thereon to assure that the optical path for the exposing light remains clear and unobstructed.

Further, an improvement in a contact printer is provided which comprises vacuum table means for supporting a photosensitive film and an original containing an image to be reproduced in superposed relationship, light means for providing an elongated beam of photoactive light for exposing the film through the original, means for moving the light means transversely of the length of the beam over the vacuum table surface over the superposed film and original whereby the superposed film and original are scanned by the light so that light exposes the film through the original. Means carried by said light moving means is provided for removably covering the superposed film and original with a substantially impervious flexible and transparent polymeric cover sheet as the exposing light is scanned across the film and original whereby the vacuum is applied to the film and the original to remove air from therebetween as the film is exposed by the light through the cover sheet and the original. The improvement comprises a pair of rollers contacting each surface of the cover sheet during use and removing dust and dirt thereon to assure that the optical path for the exposing light remains clear and unobstructed. The rollers are rotatable and driven by contact with the cover sheet and being formed of a single component urethane.

Various means for practicing the invention and other features and advantages thereof will be apparent from the following detailed description of an illustrative preferred embodiment of the invention, reference being made to the accompanying drawings.

DESCRIPTION OF THE PREFERRED EMBODIMENT

Figure 1:
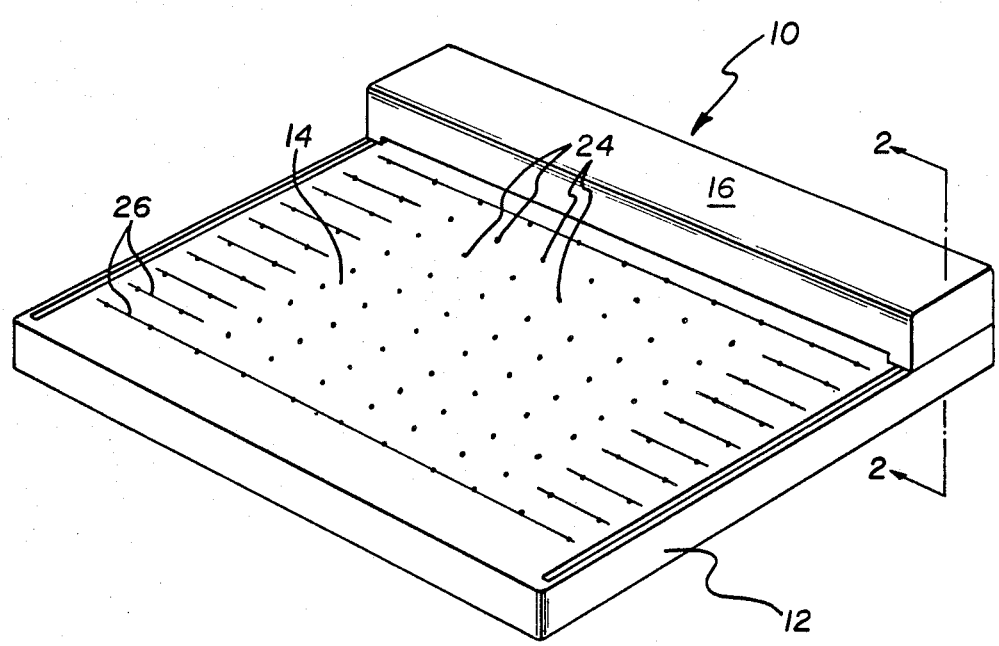
FIG. 1 is a perspective view of a preferred embodiment of the present invention.
Figure 2:
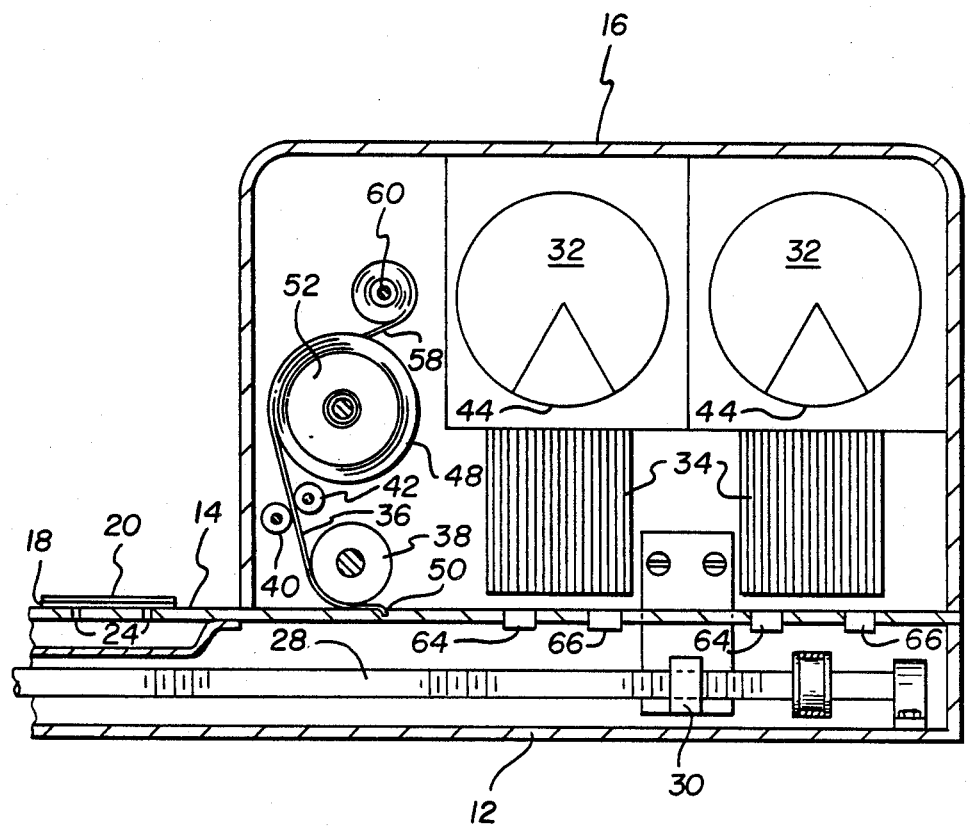
FIG. 2 is a cross-sectional view of the light trolley taken along line 2—2 of FIG. 1.
Figure 3:
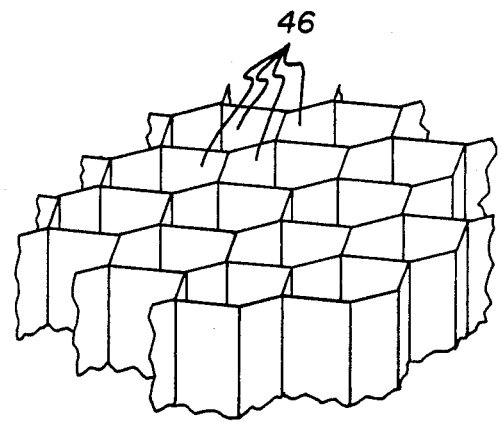
FIG. 3 is a perspective view of a portion of the light collimator.
Figure 4:
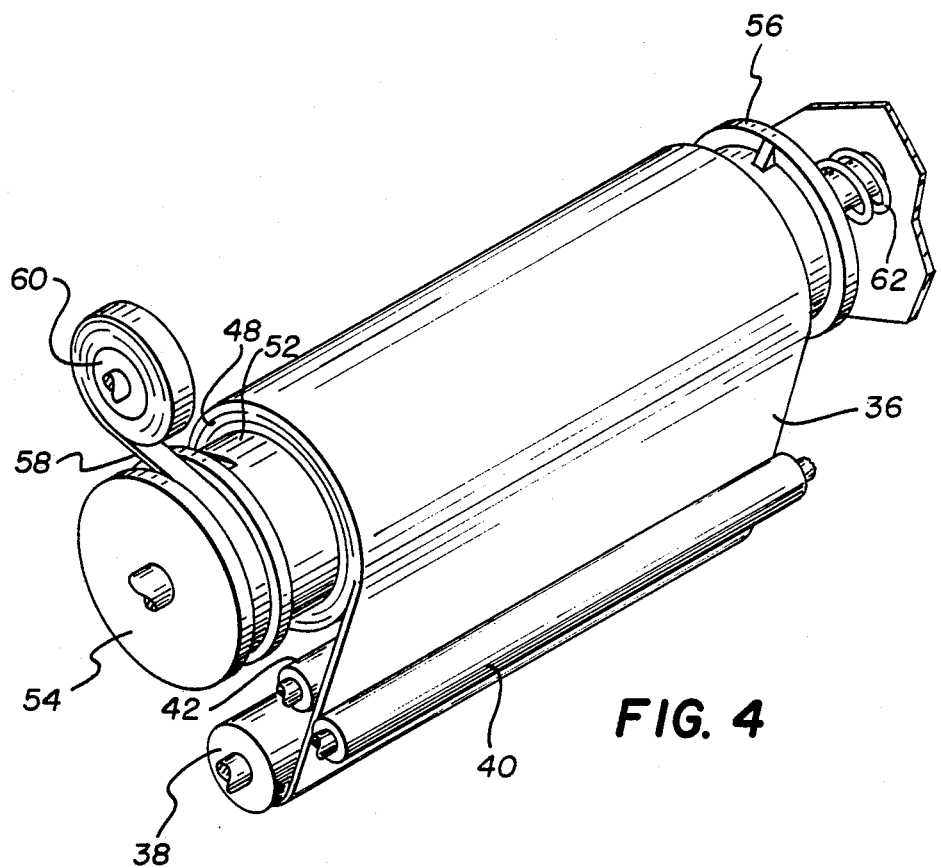
FIG. 4 is a perspective view of the cover sheet applying assembly.

Referring now to FIGS. 1 and 2, a preferred embodiment of a contact printer 10 embodying the present invention is illustrated. The contact printer comprises a platen member 12 having a planar upper surface 14 with dimensions slightly larger than the maximum dimensions of the largest original to be copied thereon. A light carriage 16, having a length approximately equal to one dimension of the platen member 12, is arranged to be moved across the platen transversely to the length of the carriage, thereby providing coverage of the entire platen during its movement.

The upper surface of the platen member 14 forms a vacuum table for the film 18 and the original 20 which are superposed thereon for exposure of the film (see FIG. 2). A rigid chamber 22, having a thickness of approximately one inch, is formed beneath the vacuum table. A plurality of vacuum ports 24 are formed in the film/original accepting portion of the surface 14 and communicate between the surface and the interior of the chamber. With the exception of the vacuum ports 24, the chamber 22 is sealed so that a vacuum pump (not shown, but normally disposed remote from the apparatus) can pull a vacuum within the chamber which is then applied, via ports 24, to the film and original which are placed on the surface 14. The ports 24 have a diameter of approximately 0.040 inch which is sufficiently large to effectively apply the vacuum to the film/original disposed on the surface 14, but is sufficiently small and the capacity of the vacuum pump is great enough that it will maintain the vacuum even though the size of the film/original is less than the maximum, leaving some of the vacuum ports uncovered. The vacuum ports outside of the area covered by the maximum size film/original are connected by shallow grooves 26 having a cross section of 0.015 inch by 0.015 inch which permit air trapped between the film/original and a cover sheet (to be further described hereinbelow) to be evacuated. It has been found that satisfactory operation can be achieved with a vacuum pump which is capable of flow rates of between 15 and 30 cfm while generating a vacuum within the chamber of between 8 and 12 inches of water.

The light carriage 16 is disposed on the upper surface of the vacuum table and is arranged to be moved across the table from a home position (the rear of the vacuum table in the example illustrated) to the opposite edge of the table, and returned to the home position. The carriage is provided with wheels (not shown) at each end thereof which ride upon tracks (not shown) provided at the lateral edges of the platen surface 14 or within the platen. The carriage is driven by a drive screw 28 within and extending the length of the platen which engages and drives a drive-nut 30 connected to the carriage. The drive screw is driven by a variable speed, reversible motor (not shown) located within the platen.

The light carriage 16 carries one or more high UV output fluorescent aperture lamps 32, with an associated mechanical light collimator 34 positioned beneath each lamp, a roll of a transparent cover sheet 36, an associated pressure roller 38, and a pair of cleaner rolls 40 and 42.

The fluorescent lamps 32 are long tubular bulbs extending the length of the carriage. The phosphors which coat the inner walls of the bulbs are selected to generate light having a wavelength in the range of 350 nm to 460 nm, which matches the sensitivity of the film being exposed. The bulbs have an internal reflective layer between the phosphor and the envelope glass which covers a major angular portion of the envelope wall and reflects a high percentage of the radiation striking it. A clear window 44, having an aperture of about 60° of the bulb circumference, is provided along the length of the bulb with no phosphor or reflective layer. This window produces an elongated, concentrated beam of high luminance UV light output along the length of the bulb because the reflective coating directs the major part of the bulb output through the uncoated window. The lamps are selectively oriented in the carriage with the windows 44 directed downwardly so that the beam of concentrated light is directed toward the sensitized film material 18.

The mechanical light collimator 34 associated with each bulb comprises a plurality of parallel, fine collimator tubes 46 which are closely spaced and which transmit parallel rays of light from the fluorescent aperture lamp to the exposure plane. Inasmuch as image quality is related to the solid angle of the light incident on the original/film lamination surface, based on a given distance between the sensitized film emulsion and the image of the original, the equivalent diameter of the tubes and their length are selected to extinguish incident angles of light at the exposure plane greater than a predetermined solid angle, for example a solid angle of between about 3° and about 9°. Moreover, since the illumination at the film surface depends upon the light output of the lamp and the distance of the lamp from the film surface, for a given lamp output, the shorter the length of the collimator, the greater the exposure power at the film. A preferred embodiment employs hexagonal tubes having an equivalent diameter of 0.125 inch and a length of 0.5 inch, with the bottom of the tube spaced above the film plane a distance of 0.5 inch.

The transparent cover sheet 36 has dimensions substantially equal to the width and length of the vacuum table and is supported as a roll 48 mounted in the carriage 16 parallel with and ahead of the fluorescent tubes (as viewed with respect to the initial travel of the carriage). The outer, free end of the cover sheet is releasably connected to the vacuum table as indicated at 50. The cover sheet is wrapped on a core 52 which is removably held at each end by hub members, 54 and 56, rotatably mounted in the carrier. One hub 54 is connected to one end of a constant force tension spring 58 which acts to apply tension to the roll of the cover sheet material as it is unwound and wound by movement of the carriage across the vacuum table, as will be further described hereinbelow. The other end of the tension spring is connected to and wrapped on a storage drum 60 where it remains in its idle position. Through the unwinding force generated as the cover sheet is unwound, the spring is transferred onto the core hub 54, and produces the winding torque moment to the shaft of the core to rewind the cover sheet when the carriage movement is reversed. The other hub 56 is spring loaded along the core axis by an axial compression spring 62. The axial compression spring permits the hub 56 to be moved axially, disengaging the cover sheet roll to permit its easy replacement. Thus, when the cover sheet becomes damaged, worn, scratched, dirty or translucent, and thus would adversely affect the exposure light directed therethrough, it can be replaced with a new cover sheet.

The cover sheet 36 is formed of an impermeable sheet of a polymeric material which is substantially transparent to UV radiation. The material also preferably resists abrasion and possesses anti-static properties, or is treated to obtain these properties, so that it resists the accumulation of dust, dirt, and other materials which would adversely affect the transmission of exposing light therethrough, or which would adversely affect the collimation of the light. It has been found that a sheet of clear polyester sheeting having a thickness of approximately 0.004 inch satisfactorily meets these requirements. The sheeting may be provided with anti-static properties via coatings or other treatments to minimize the static attraction of dust and dirt to the cover sheet, to prevent the cover sheet from "clinging" to the film/original laminate, and to prevent static discharges which can impart an unwanted exposure to the film. The sheeting can also be provided with an abrasion resistant coating to minimize scratching of the cover sheet which would adversely affect its "clear" optical properties. Still further, the cover sheet can be provided, on the surface thereof which contacts the film/original laminate, with an optically clear matte finish which facilitates the ready application of the vacuum to the cover sheet/original/film laminate by providing miniscule air passages for the removal of air. The cover sheet acts as a "vacuum lid" as it is unwound over the original/film laminate during vacuum drawdown as the carriage is moved across the vacuum table to expose the film. The cover sheet also protects the original/film laminate underneath from any abrasive action of the pressure roller 38 as it forces the cover sheet/original/film lamination into intimate contact to remove any air from the lamination which might otherwise distort the resulting exposure.

Because of its importance to the satisfactory exposure of the contact print, the cover sheet must be kept clean. As an aid to keeping the cover sheet optically clean and free from dust and lint, the cleaner rolls 40 and 42 are mounted transversely of the light carriage 16 between the cover sheet roll 48 and the pressure roller 38 in engagement with the front and rear surfaces of the cover sheet 36. The cleaner rolls are rotatable and are driven by contact with the cover sheet as it is unwound over the film/original laminate and rewound during each exposure cycle. The cleaner rolls are formed of a single component urethane having 20 durometer Shore A hardness which clean the cover sheet without scratching.

OPERATION

Initially, the light carriage 16 is parked at the rear of the vacuum table 14. A sheet of film or paper 18 is positioned emulsion side-up on the platen. The longest sheet dimension is preferably perpendicular to carriage motion to minimize the carriage travel necessary to fully cover the sheet and thus keep the time required to a minimum. The vacuum pump is activated and applies the vacuum to the film through the ports 24 to hold the film to the platen surface. The original 20, such as a color separation, is then placed on top of the film. The separation can be positioned by means of registration pins (not shown). If registration pins are used, they are located along the edge of the original/film laminate closest to the carriage home position. The type of film or paper to be exposed, or the exposure speed thereof, is entered into the machine controller. The film information and lamp intensity readings are then used to calculate the carriage traverse speed. When the "start" button is actuated, the carriage 16 moves forward toward the front edge of the platen 14 at the proper dot-for-dot exposure speed. While the carriage moves forward, the clear anti-static cover sheet 36 is unwound to cover the original/film lamination. The pressure roller 38 pushes out any remaining air from the lamination and the cover sheet is drawn into intimate contact with the lamination by the vacuum through the ports 24. The carriage continues until the "end of travel" position is reached and reverses direction to finish exposing the film and return to the home position. As the carriage returns to the home position, the cover sheet 36 is rewound on the core 52 by the constant tension spring 58, uncovering the original/film lamination after exposure for that area has been completed. It is apparent that with small film sizes, complete traverse of the platen by the carriage is not necessary. The "end of travel" position is selectable and can be specified by the user. When the carriage is back at home position, the vacuum and the lamps are shut off or placed on standby, and the film and separation can be removed.

The invention has been described with reference to specific embodiments and variations, but it should be apparent that other modifications and variations can be made within the spirit and scope of the invention, which is defined by the following claims.

We claim:

1. In a contact printer which comprises means for supporting a film and an original in superposed relationship on a vacuum table, means for providing a source of light for exposing said film through said original, means for moving said light over the surface of said superposed film and original, a substantially impervious flexible and transparent cover sheet carried by said light moving means arranged to cover said superposed film and original as said exposing light is scanned across said film and original whereby the vacuum is applied to said film and said original to remove air from therebetween as said film is exposed by said light through said cover sheet and said original, the improvement comprising means for contacting the surface of said cover sheet during use and removing dust and dirt thereon to assure that the optical path for the exposing light remains clear and unobstructed.

2. A contact printer according to claim 1 wherein said contacting means comprises a roller member.

3. A contact printer according to claim 1 wherein said contacting means comprises a pair of roller members each of which contacts one surface of said cover sheet.

4. A contact printer according to claim 2 wherein said roller member is formed of a polymeric material.

5. A contact printer according to claim 4 wherein said polymeric material is a single component urethane.

6. A contact printer according to claim 1 wherein said roller member is rotatable and is driven by said cover sheet.

7. In a contact printer comprising vacuum table means for supporting a photosensitive film and an original containing an image to be reproduced in superposed relationship, light means for providing an elongated beam of photoactive light for exposing said film through said original, means for moving said light means transversely of the length of said beam over said vacuum table surface over said superposed film and original whereby said superposed film and original are scanned by said light so that light exposes said film through said original, means carried by said light moving means for removably covering said superposed film and original with a substantially impervious flexible and transparent polymeric cover sheet as said exposing light is scanned across said film and original whereby said vacuum is applied to said film and said original to remove air from therebetween as said film is exposed by said light through said cover sheet and said original, the improvement comprising a pair of rollers contacting each surface of said cover sheet during use and removing dust and dirt thereon to assure that the optical path for the exposing light remains clear and unobstructed, said rollers being rotatable and driven by contact with said cover sheet, said rollers being formed of a single component urethane.

* * * * *